United States Patent [19]
Taniguchi et al.

[11] Patent Number: 5,319,637
[45] Date of Patent: Jun. 7, 1994

[54] SYNCHRONOUS CONTROL METHOD IN PLURALITY OF CHANNEL UNITS AND CIRCUIT USING SAID METHOD

[75] Inventors: Atsuki Taniguchi; Satoshi Takeda, both of Kawasaki; Norihisa Miura, Tokyo, all of Japan

[73] Assignee: Fujitsu Limited, Kawasaki, Japan

[21] Appl. No.: 867,141

[22] Filed: Apr. 10, 1992

[30] Foreign Application Priority Data

Apr. 15, 1991 [JP] Japan .................................. 3-109864

[51] Int. Cl.[5] ........................ H04J 3/12; H04L 12/52
[52] U.S. Cl. .................. 370/58.1; 370/110.1; 370/112
[58] Field of Search ............ 370/112, 58.1, 58.2, 370/58.3, 13, 110.1

[56] References Cited

U.S. PATENT DOCUMENTS 4,788,680  11/1988  Kikuchi et al. .................... 370/112
4,829,518   5/1989  Iquchi et al. ...................... 370/112
4,933,934   6/1990  Aikoh et al. ...................... 370/112

Primary Examiner—Wellington Chin

[57] ABSTRACT

A synchronous control method in a plurality of channel units for synchronously transmitting each transmission signal in response to a synchronous control signal by a plurality of channel units comprising the process steps of providing a synchronous control circuit for outputting a synchronous control signal to each channel unit; and supplying the synchronous control signal from the synchronous control circuit corresponding to a high order channel unit to the self-channel unit and the synchronous control circuit corresponding to a low order channel unit in response to the synchronous signal in the transmission signal. By using this method, a synchronous control circuit having a single circuit constitution can respond to many combinations of arbitrary channels.

6 Claims, 7 Drawing Sheets

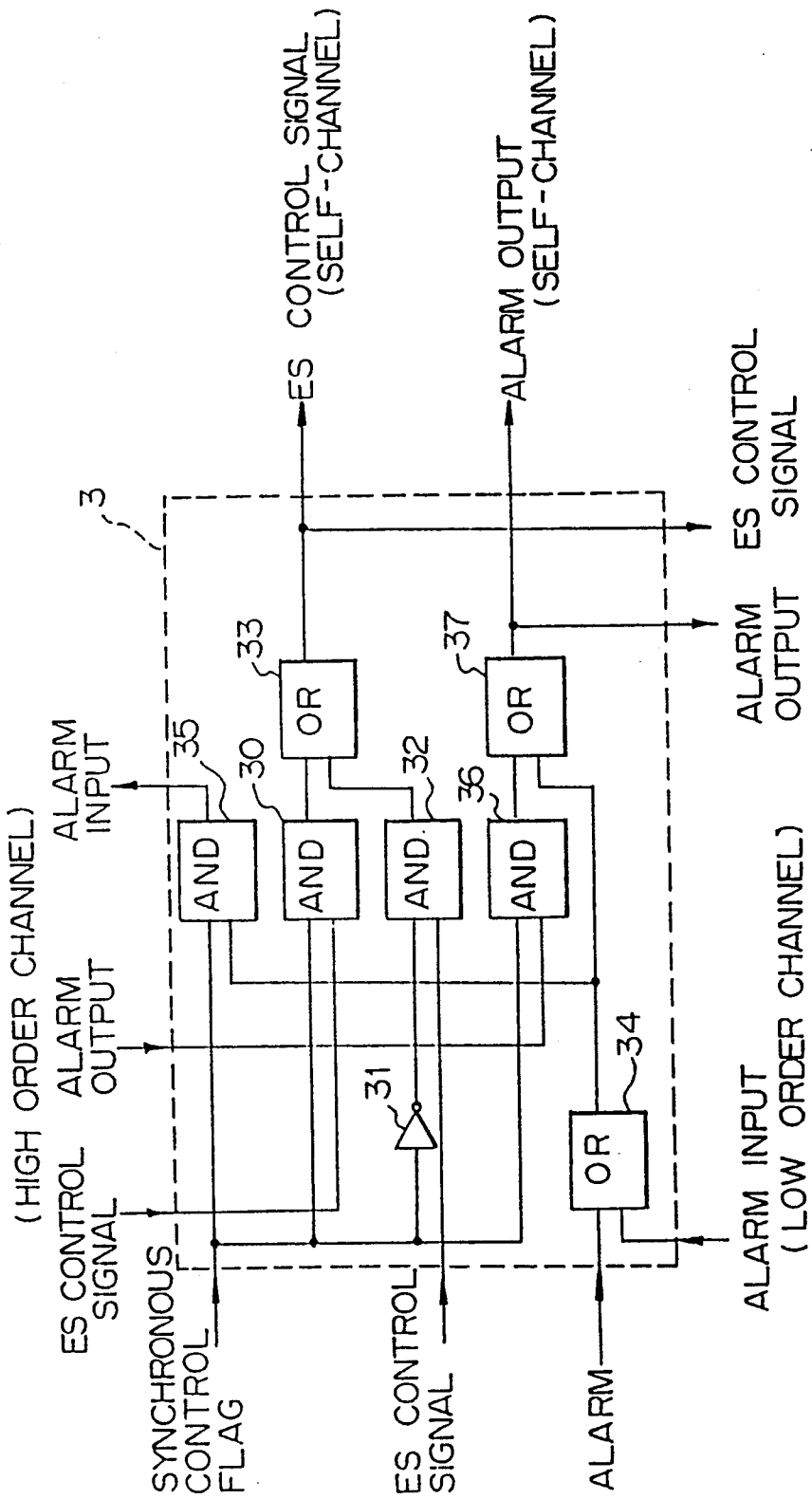

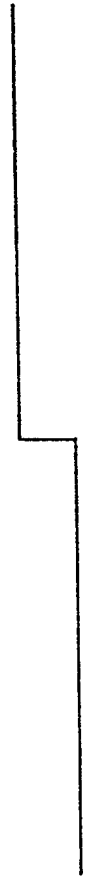

SYNCHRONOUS CONTROL METHOD IN PLURALITY OF CHANNEL UNITS AND CIRCUIT USING SAID METHOD

BACKGROUND OF THE INVENTION

1. Field of the Invention

The present invention relates to a synchronous control method in a plurality of channel units and a circuit using said method for synchronously controlling a transmission operation of the plurality of channel units. In a synchronous transmission system, each frame of the transmission signal of a plurality of channels is synchronized thereamong. To execute the frame synchronization, transmission operation in each channel unit by which a transmission signal is transmitted, is controlled synchronizedly. In the synchronous control of the channel units, a necessary synchronous control method is executed corresponding to combinations of the channel units.

2. Description of the Related Art

The synchronous transmission system, for example, receives 150 Mb/s inputs having three 50 Mb/s signals by three channel units in a transmission process circuit, multiplexes the same to 150 Mb/s to transmit by a multiplex circuit, separates the multiplex signal into three 50 Mb/s signals by a separation circuit of a reception process circuit, and the separated signals are output from three channel units.

In this synchronous transmission, since frame positioning of the transmission signals is carried out in the three channel units of the transmission process circuit and three channel units of the reception process circuit, synchronous control circuits are provided in the transmission process circuit and the reception process circuit, and the synchronous control circuit supplies the synchronous control signal to the channel units of the transmission process circuit and the channel units of the reception process circuit for synchronous control.

When the plurality of channel units are transmitted and synchronized, since applied channel numbers and combinations of the channel units are already determined, the necessary synchronous control circuit is used in response to the combination.

While, for effective utilization of lines, particularly at a high speed condition of transmission, there is a request for arbitrary synchronized channel numbers by various combinations of the channel units.

In this constitution, hitherto, since the synchronous control circuit is used corresponding to a combination of the channel units, the synchronous control circuits that are the same number as the channel units combination, must be provided, and moreover, there is a problem in that all the combinations are not always carried out.

Also there is another problem in that when 150 Mb/s circuit is added to another 150 Mb/s circuit to expand the system, the synchronous control cannot be carried out within the system, the expansion of the system is difficult, and the circuitry must be changed in response to the application aspects.

SUMMARY OF THE INVENTION

An object of the present invention is to provide a synchronous control method of a plurality of channel units and a circuit using said method which can synchronously control the plurality of channel units, by only a single circuit, corresponding to arbitrary combinations of the plurality of channel units.

According to an aspect of the invention, there is provided a synchronous control method in a plurality of channel units for synchronously transmitting each transmission signal in response to a synchronous control signal by a plurality of channel units, the method comprising the steps of providing a synchronous control circuit for outputting a synchronous control signal to each channel unit; supplying the synchronous control signal from the synchronous control circuit corresponding to a high order channel unit to the self-channel unit and the synchronous control circuit corresponding to a low order channel unit in response to the synchronous signal in the transmission signal.

Further, according to another aspect of the invention, there is provided a synchronous control circuit for a plurality of channel units using a synchronous control method for synchronously transmitting each transmission signal in response to a synchronous control signal by the plurality of channel units, the circuit comprising a logical operation circuit wherein a synchronous control signal for a self-channel unit and a synchronous control signal for a low order channel unit are output, the synchronous control signals are determined by a conjunction of a synchronous control signal corresponding to a high order channel unit and a synchronous control flag in a transmission signal from a self-channel unit or by a conjunction of a synchronous control signal from a self-channel unit and an inverted signal of the synchronous control flag from the self-channel unit.

Other features and advantages of the invention will be apparent from the following description with reference to the accompanying drawings.

BRIEF DESCRIPTION OF THE DRAWINGS

FIG. 6 is an embodiment of a circuit diagram of a synchronous control circuit of the system of FIG. 5; and FIG. 7 is an explanatory diagram for illustrating an operation of a synchronous control in the synchronous control circuit in FIG. 6.

DESCRIPTION OF THE PREFERRED EMBODIMENTS

Prior to the explanation of the present invention, a related art of this invention is explained with reference to FIGS. 1-3 of the drawings.

Figure 1:
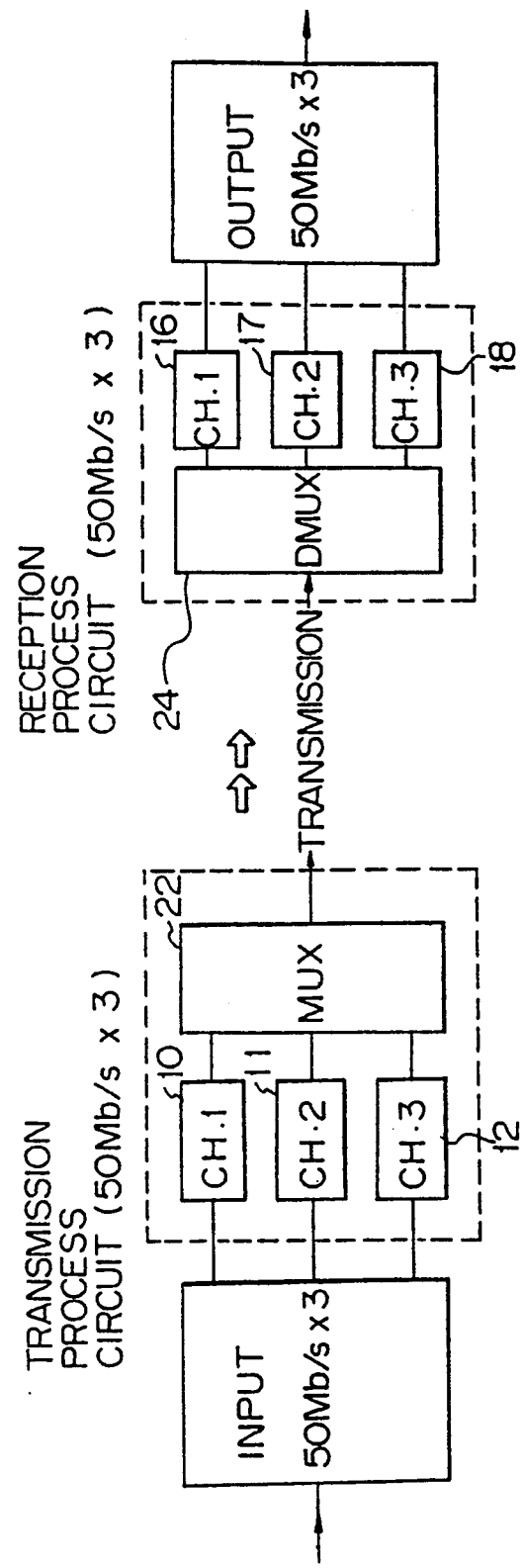
FIG. 1 is a block diagram showing a synchronous transmission system of a related art.
Figure 2:
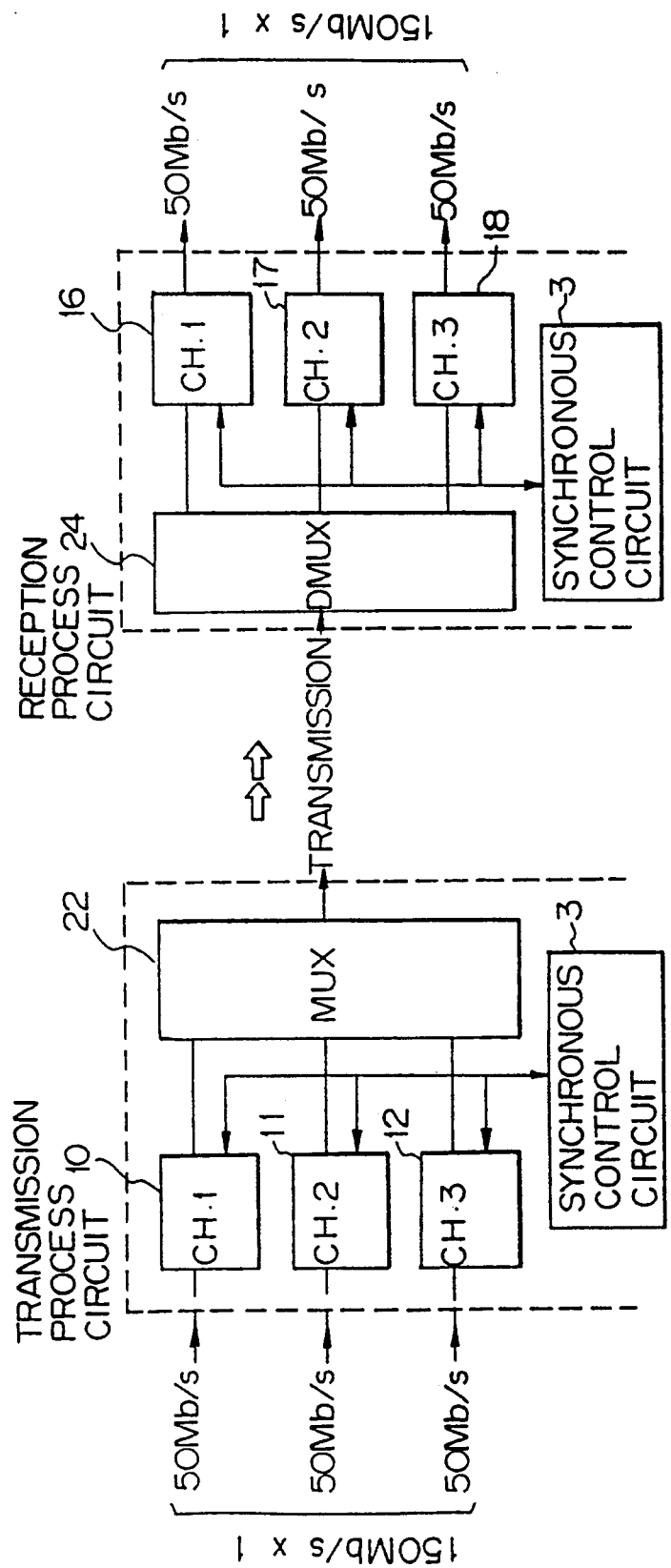
FIG. 2 is a block diagram illustrating a synchronous transmission system of another related art.

FIG. 1 and FIG. 2 are block diagrams illustrating the related art. In FIG. 1, a synchronous transmission system is shown and in FIG. 2, a synchronous control of the transmission system of another prior art is shown.

As shown in FIG. 1, a synchronous transmission system receives, for example, three inputs of 50 Mb/s (Megabit/second) at channel units 10 to 12 of a transmission process circuit, the three inputs multiplexed by a multiplex circuit (MUX) 22 to 150 Mb/s, are transmitted to a reception process circuit, separated by a separation circuit (DMUX) 24 into three outputs of 50 Mb/s and output from channel units 16 to 18.

In the above synchronous transmission system, since the respective channel units 10 to 12 and 16 to 18 carry out frame synchronization of the transmission signals, as shown in FIG. 2, a synchronous control circuit 3 is provided in the transmission process circuit and the reception process circuit, respectively. The respective synchronous control circuit 3 supplies the synchronous control signal to each respective channel unit 10 to 12 and 16 to 18, and the system is controlled in a synchronized manner.

When the plurality of channels are transmitted synchronizedly, since the applied number of the channel, a combination of the channels, or the like have already been determined, the synchronous control circuit corresponding to the combination is used.

Figure 3:
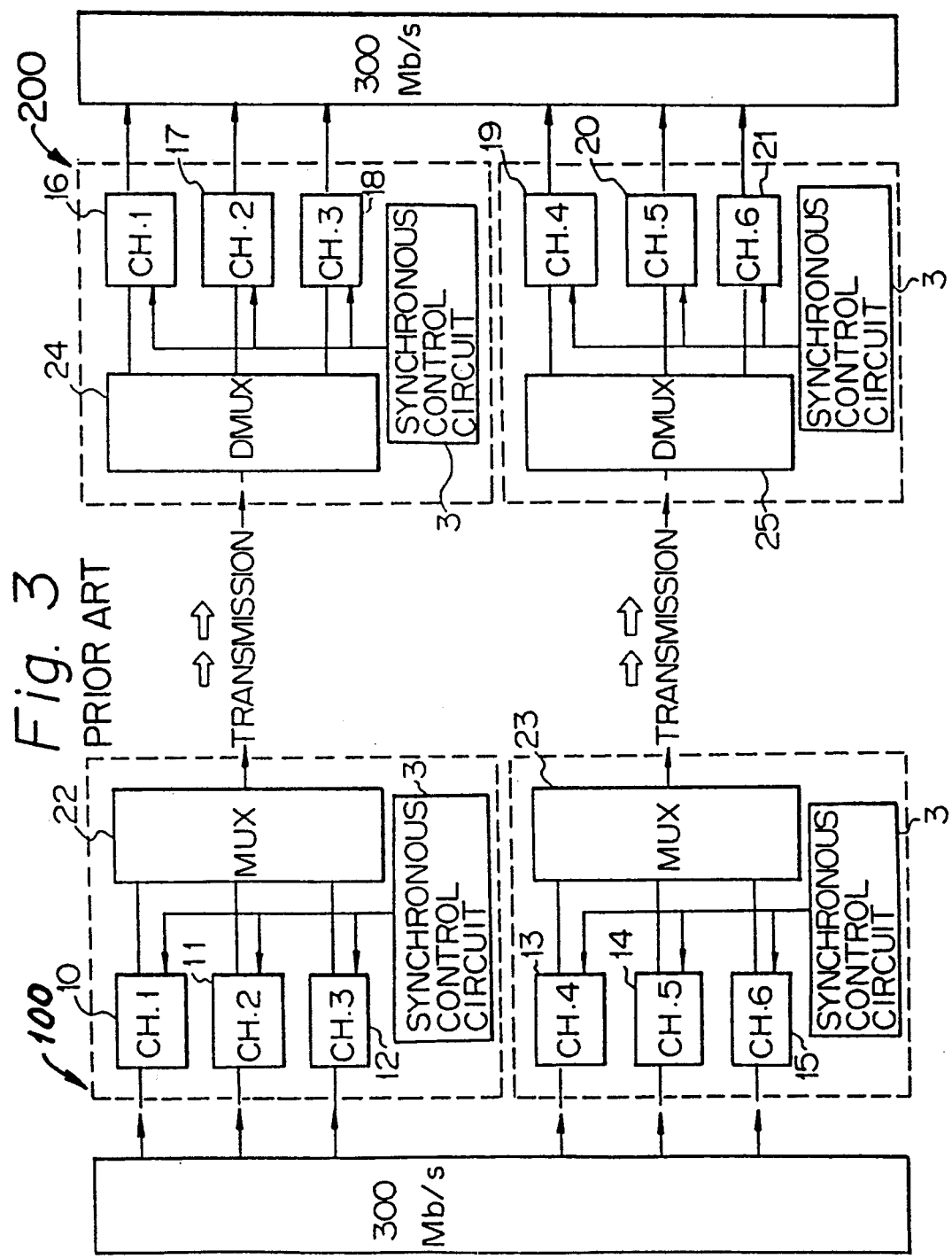
FIG. 3 is a block diagram for explaining problems in a related art.

In FIG. 3, problems which occur in the related art are explained. To utilize lines effectively at high speed transmission by various combinations of the channels, arbitrary acquisition of the synchronized number of channels is requested. As seen in FIG. 3, a transmission process circuit 100 includes two transmission process circuits similar to that shown in FIG. 2 and each receiving three inputs of the 300 Mb/s at their respective channel units, from which transmission signals are respectively transmitted to a reception process circuit 200 including two reception process circuits similar to that shown in FIG. 2.

In this case, hitherto, since the synchronous control circuit corresponding to the combination of the channels is used, there is a problem wherein the synchronous control circuits being the same number as the number of the channel combinations must be provided. Moreover, the provided synchronous control circuits cannot respond to all the combinations.

Further as shown in FIG. 3, in the case when the system is expanded by providing another 150 Mb/s system in addition to a 150 Mb/s system shown in FIG. 2, the synchronous control is not carried out, the expansion of the system is difficult, and the circuit constitution must be changed depending on the application aspect.

Figure 4:
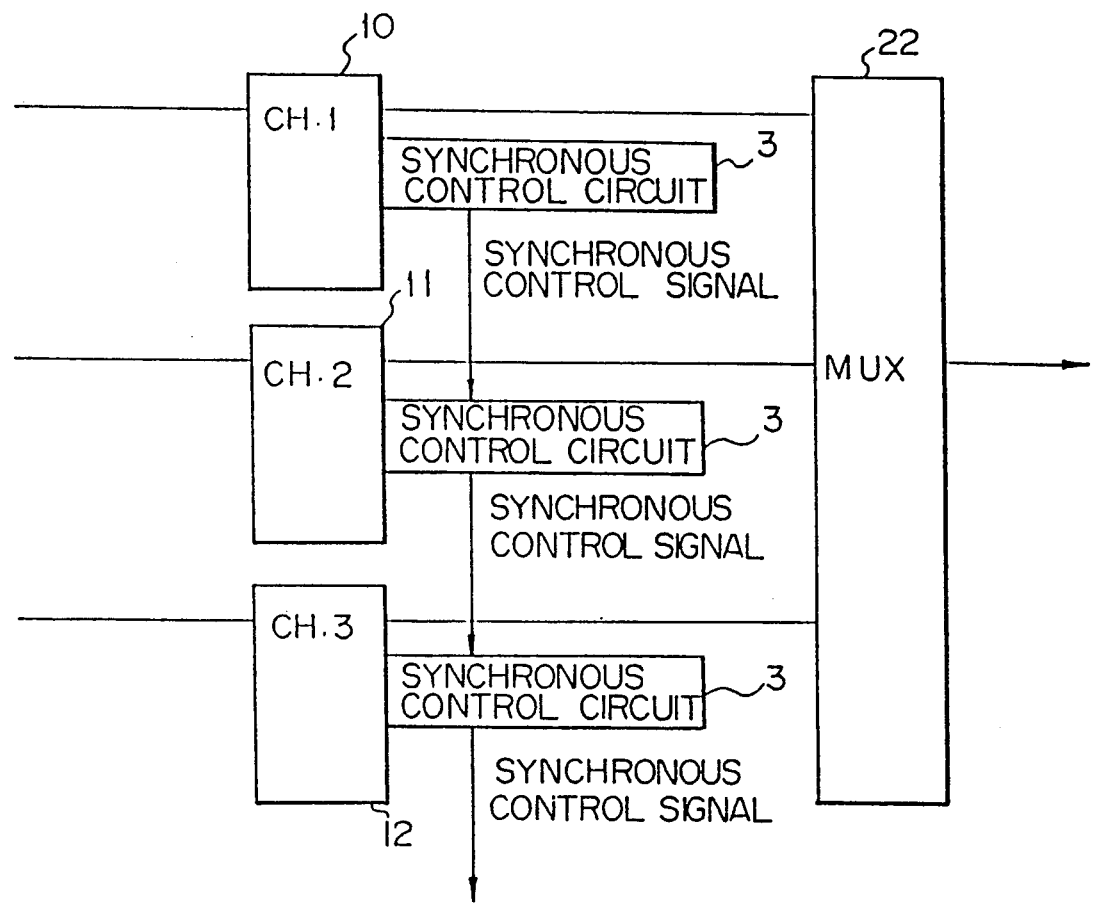
FIG. 4 is a block diagram for explaining a summary of the present invention.

Next, the summary of the present invention will be explained. As shown in FIG. 4, in the embodiment of this invention, a synchronous control circuit 3 outputting a synchronous control signal is provided in each of channel units 10 to 12, of the transmission process circuit. Since the synchronous control signal from the synchronous control circuit 3 of a high order channel unit is output to a self-channel unit and to the synchronous control circuit 3 of a low order channel unit, in response to the synchronous signal in the transmission signal; the low order channel unit is synchronized with the high order channel unit, an arbitrary channel synchronization is possible by single circuitry and only the necessary channel can be synchronized.

In a working aspect of this invention, the synchronous control signal is an address signal of a memory of the channel units 10 to 12, and a frame synchronization of the transmission signal is realized by the memory control.

In another working aspect of this invention, when the synchronous control circuit 3 is in a synchronous control state, an alarm signal from the high order or low order is output to the self-channel unit and transmits the same to the low order or high order channel unit, and the alarm can be despatched to all the channels at a synchronous state to process. When not in a synchronous state, an unnecessary alarm is not imparted to the other channel units.

Next, an embodiment of the present invention will be explained with reference to FIG. 5 wherein a transmission process circuit of the present invention is shown. FIG. 6 shows a synchronous control circuit and FIG. 7 is an explanatory diagram of the operation of the synchronous control circuit according to the invention. The identical reference numerals shown in FIGS. 1 and 4 designate the same articles.

Figure 5:
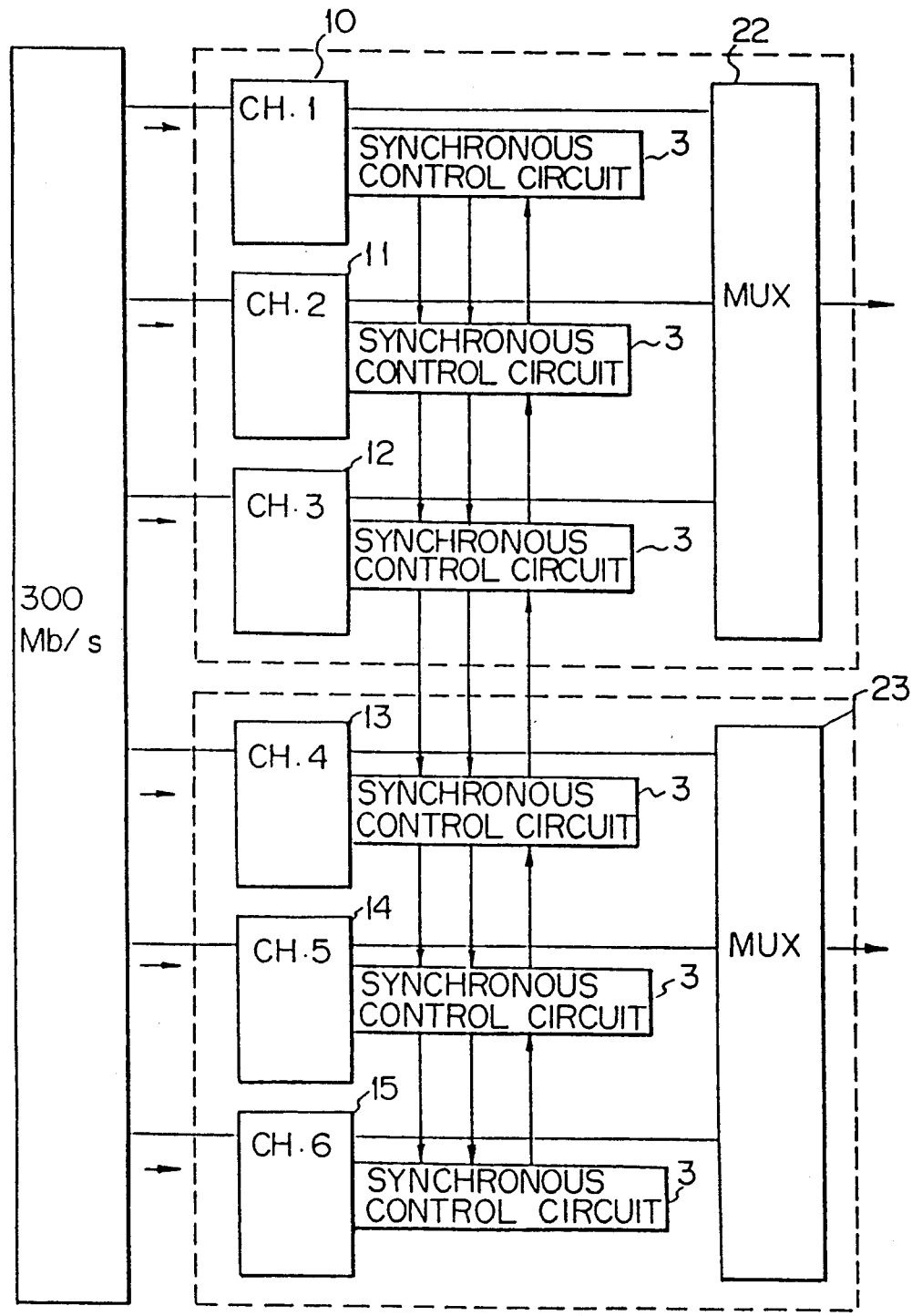
FIG. 5 is a block diagram for illustrating a transmission process circuit of a system executing a synchronous control method in a plurality of channel units according to the embodiment of the invention.

In FIG. 5, six 50 Mb/s lines are connected between the 300 Mb/s and six channel units 10 to 15 which are in turn connected to multiplexers (MUX) 22 and 23 which multiplex the six channels to two 150 Mb/s channels. To synchronously control the above six channels 10 to 15, the synchronous control circuits 3 are respectively provided in each of the channel units 10 to 15.

The synchronous control circuit 3, as shown in FIG. 6, comprises an AND gate 30 for supplying a conjunction between a synchronous control flag by a synchronous signal detected from the transmission signal by the channel unit and an ES (elastic memory) control signal (memory address) from the synchronous control circuit 3 of a high order channel unit, an inverter 31 inverting the synchronous control flag, an AND gate 32 for supplying a conjunction between an ES control signal (memory address) of the self-channel unit and the inverted synchronous control flag, and an OR gate 33 for supplying a logical add between outputs of AND gates 30 and 32 and outputting the ES control signal (memory address) to the self-channel unit and to the low order channel unit.

The synchronous control circuit 3 further comprises an OR gate 34 for supplying a logical add between an alarm of the self-channel unit and an alarm of the low order channel unit, an AND gate 35 for supplying a conjunction between the synchronous control flag and the alarm output of the OR gate 34, an AND gate 36 for supplying a conjunction between the synchronous control flag and the alarm of the high order channel unit, and an OR gate 37 for supplying a logical add between the alarm output of the OR gate 34 and the alarm output of the AND gate 36 and for outputting the alarm output to the self-channel unit and the low order channel unit.

The synchronous control operation is explained with reference to FIG. 7. When the synchronous control flag is not detected, the AND gate 32 opens (ON) and the AND gate 30 closes (OFF), then, the memory address of the self-channel unit is output from the OR gate 33 to the self-channel unit and the low order channel unit. Thus, the self-channel unit writes or reads the transmission signal to or from an elastic memory in accordance with the memory address of the self-channel unit.

On the other hand, if the self-channel unit detects the synchronous signal from the transmission signal, the synchronous control flag turns ON, the AND gate 32 closes (OFF) and the AND gate 30 opens (ON), and thus the memory address of the high order channel unit is output from the OR gate 33 to the self-channel unit and the low order channel unit.

Therefore, the self-channel unit writes or reads the transmission signal to or from the elastic memory in accordance with the memory address of the high order channel unit.

As mentioned above, the low order channel unit is synchronized and controlled depending on the high order channel unit, and in spite of the combination of the channel units, only a single synchronous control circuit can be synchronized and control the low order channel unit.

While, in the alarm siqnal, when the synchronous control flag is not detected, the AND gate 35 closes (OFF) and the AND gate 36 closes (OFF), and thus the alarm signal of the self-channel unit is not transmitted to both the high order channel unit and low order channel unit, accordingly at the asynchronous state, the unnecessary alarm signal is not transmitted.

On the other hand, when the self-channel unit detects the synchronous signal from the transmission signal, the synchronous control flag turns ON, the AND gate 35 opens (ON), the AND gate 36 opens (ON), the alarm signal of the self-channel unit and the alarm signal of the low order channel unit can be transmitted to the high order channel unit, and the alarm signal of the high order channel unit can be transmitted to the self-channel unit and the low order channel unit. Thus, in the synchronizing state, an alarm of one channel can be transmitted to all the channels, and when asynchronous state occurs, a countermeasure can be carried out.

In addition to the above described embodiment, the following modifications are possible. In the above embodiment, the synchronous control signal is obtained by using an address of an elastic memory; however, instead, the other synchronous control signal such as a timing signal or the like can be used.

In the embodiment, an example wherein all the channel units are synchronously controlled is shown; however, in the circuit comprising 12 channels, for example, the following aspect can be applied. Namely, the 3 channels are synchronized as a circuit, the 4 channels are synchronized as another circuit, and the 5 channels are further synchronized as a still another circuit, or the like.

Also, in the preferred embodiment, the invention has been explained using an example of the multiplex unit; this, however, may be applied to a separation unit, a cross connect unit or the like.

Besides the above embodiments, various modifications are possible, without departing from the scope of the subject matter of this invention. These modifications also should not be excluded.

In this invention, the synchronous control circuits 3 outputting the synchronous control signal are provided in the respective channel units 10 to 12, and the synchronous control signal from the synchronous control circuit 3 of the high order channel unit is output to the self-channel unit and transmitted to the synchronous control circuit 3 of the low order channel unit in response to the synchronized signal in the transmission signal. Thus, the lower channel units are synchronized with the high order channel unit, the synchronization of the arbitrary channel is possible by the single circuitry, and many synchronous control circuits corresponding to combinations of the channels of the prior art are not needed.

Further, since the synchronization of the arbitrary channel is possible by the single circuitry, only the necessary channel can be easily synchronized.

We claim:

1. A synchronous control method in a plurality of channel units of a synchronous transmission system, said channel units including a high order channel unit, a self-channel unit and a low order channel unit, for synchronously transmitting transmission signals, each transmission signal being transmitted in response to a synchronous control signal by the plurality of channel units, the method comprising the steps of:
   providing a plurality of synchronous control circuits for said plurality of channel units so that each synchronous control circuit outputs a respective synchronous control signal to each respective channel unit; and
   supplying the synchronous control signal from the synchronous control circuit corresponding to the high order channel unit to the self-channel unit and to the synchronous control circuit corresponding to the low order channel unit in response to the synchronous signal in the transmission signal.

2. A synchronous control method as set forth in claim 1, wherein each of the channel units has a memory an address signal of which is said respective synchronous control signal.

3. A synchronous control method as set forth in claim 1, wherein when said synchronous control circuit of each channel unit is in a synchronous control state, the synchronous control circuit of the high order channel unit supplies an alarm signal to the self-channel unit and to the low order channel unit or the synchronous control circuit of the low order channel unit supplies an alarm signal to the self channel unit and to the high order channel unit, respectively.

4. A synchronous control unit for each channel unit in a plurality of channel units of a synchronous transmission system, said channel units including a high order channel unit, a self-channel unit and a low order channel unit, for synchronously transmitting transmission signals, each transmission signal being transmitted in response to a synchronous control signal by the plurality of channel units, the circuit comprising:
   a logical operation circuit wherein a synchronous control signal for the self-channel unit and a synchronous control signal for the low order channel unit are output wherein synchronous control signals for the self-channel unit and the low order channel unit are determined by the conjunction of a synchronous control signal corresponding to the high order channel unit and a synchronous control flag in the transmission signal from the self-channel unit or by a conjunction of a synchronous control signal from the self-channel unit and an inverted signal of the synchronous control flag from the self-channel unit.

5. A synchronous control circuit as set forth in claim 4, wherein each of the channel units has a memory, of which an address signal is said respective synchronous control signal.

6. A synchronous control circuit as set forth in claim 4, and further comprising an alarm circuit for supplying an alarm input to the high order channel unit by a conjunction of the synchronous control flag from the self-channel unit in the transmission signal and a logical add between an alarm signal from the self-channel unit and an alarm signal from the low order channel unit and for supplying an output determined to be either a conjunction of an alarm signal from the high order channel unit and the synchronous control flag or a logical add of the alarm signal from the self-channel unit and the alarm signal from the low order channel unit as an alarm output of the self-channel unit and an alarm output of the low order channel unit.

* * * * *